US007234009B2

(12) United States Patent
Sandman et al.

(10) Patent No.: US 7,234,009 B2
(45) Date of Patent: Jun. 19, 2007

(54) USE OF AN OPTICAL INTERFACE FOR REMOVABLE MAGNETIC MEDIA

(75) Inventors: Robert Sandman, Syracuse, UT (US); Troy Davidson, Clinton, UT (US)

(73) Assignee: Iomega Corporation, San Diego, CA (US)

( * ) Notice: Subject to any disclaimer, the term of this patent is extended or adjusted under 35 U.S.C. 154(b) by 444 days.

(21) Appl. No.: 10/805,852

(22) Filed: Mar. 22, 2004

(65) Prior Publication Data

US 2005/0210194 A1    Sep. 22, 2005

(51) Int. Cl.
*G06F 13/12* (2006.01)
(52) U.S. Cl. .............................. 710/62; 703/23; 703/24; 703/25; 703/26; 703/27; 703/28
(58) Field of Classification Search .................. 710/62; 703/23–28
See application file for complete search history.

(56) References Cited

U.S. PATENT DOCUMENTS 6,874,060 B2 * 3/2005 Blood et al. ................. 711/111
7,058,284 B2 * 6/2006 Zou et al. ..................... 386/94
2003/0225568 A1 * 12/2003 Salmonsen ................... 703/27

OTHER PUBLICATIONS

"Universal Disk Format Specification", Apr. 30, 2003, pp. 1-3, 136-143.*

* cited by examiner

*Primary Examiner*—Donald Sparks
*Assistant Examiner*—Chun-Kuan Lee
(74) *Attorney, Agent, or Firm*—Stephen C. Beuerle; Procopio, Cory, Hargreaves & Savitch LLP

(57) ABSTRACT

A removable magnetic storage device uses an optical drive interface to appear to the operating system as an optical drive. Thus, a removable magnetic drive appears to the operating system as a large optical device similar to DVD/CD, and receives similar functionality. By appearing as an optical device, the removable magnetic storage device can use many features not currently available to magnetic storage devices, such as autorun, multiple volume sets, larger capacity, and efficient space allocation.

10 Claims, 2 Drawing Sheets

USE OF AN OPTICAL INTERFACE FOR REMOVABLE MAGNETIC MEDIA

TECHNICAL FIELD

This invention relates to removable physical storage, and more particularly to the use of an traditional optical interface for removable magnetic media.

BACKGROUND

Removable magnetic media support is generally lacking on most platforms. The Microsoft family of Windows operating systems current support for large magnetic removable media is insufficient for good customer experience. Optical removable media is receiving much more industry support in terms of operating system usage.

In September 1995, the Optical Storage Technology Association (OSTA), published specifications for a read/write file system known as Universal Disk Format (UDF), designed to be a single file system interchange standard for computer-based applications. An implementation of the International Standards Organization (ISO) interchange standard for non-sequential recording of data (ISO 13346), UDF was engineered to make optical storage solutions independent of the data system. Universal Disk Format is a universal vendor-independent file system for optical media designed for data interchange and portability, allowing an operating system to read, write and modify data stored on optical media that was created by another operating system. The UDF is defined by the Universal Disk Format® Specification, Revisions 1.0 to 2.50, with the latest published Apr. 30, 2003 by the Optical Storage Technology Association, which is incorporated by reference herein.

What is needed is support for large magnetic removable devices by treating the removable magnetic media as if it were a removable optical device. Moving to an optical interface puts removable magnetic media on par to compete with the Optical drive industry such as CD/DVD type devices, rather than being compared to the hard drive industry.

SUMMARY

A removable magnetic storage device uses an optical drive interface to appear to the operating system as an optical drive. This is achieved by utilizing the command set normally associated with CD/DVD type devices. Which are documented in the MMC specification. Thus, a removable magnetic drive appears to the operating system as a large optical device similar to DVD/CD, and receives similar functionality. By appearing as an optical device, the removable magnetic storage device can use many features not currently available to magnetic storage devices, such as autorun, multiple volume sets, larger capacity, and efficient space allocation.

DESCRIPTION OF DRAWINGS

These and other features and advantages of the invention will become more apparent upon reading the following detailed description and upon reference to the accompanying drawings.

DETAILED DESCRIPTION

UDF is used for removable media like DVD, CD, compact disc-recordable (CD-R), compact disc-rewritable (CD-RW), write once, read many (WORM), and magneto-optical (MO) discs. Because UDF is based on open standards, it is intended to facilitate data interchange between operating systems and between consumer devices.

Figure 1:
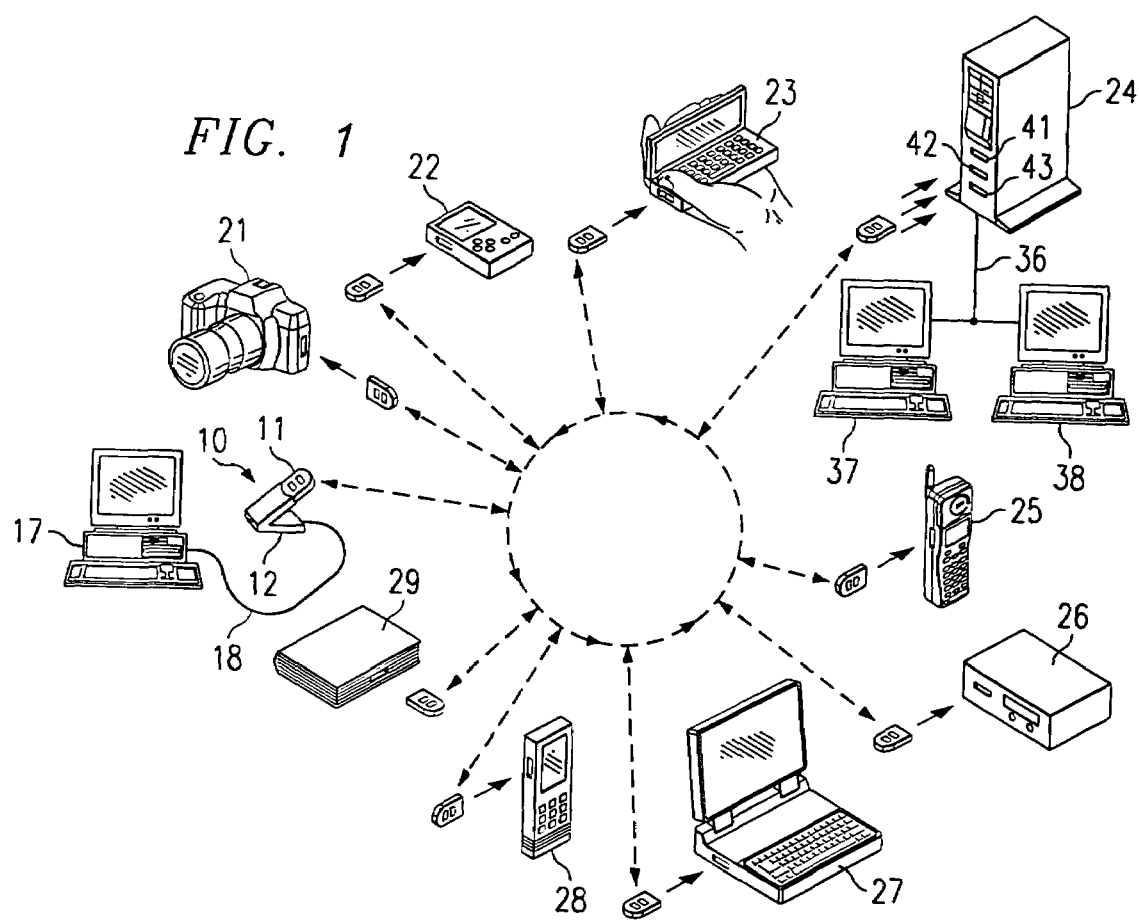
FIG. 1 is a diagrammatic view showing an information storage device according to the present invention which includes a cartridge and is coupled to a host computer system, and also showing a plurality of other types of devices into which a cartridge from the information storage device can be removably inserted.

FIG. 1 is a diagrammatic view showing an information storage device 10 which embodies the present invention, which includes an information storage cartridge 11 removably inserted into a receiving unit or drive 12, and which is coupled by a cable 18 to a host computer system 17. FIG. 1 also shows a variety of other devices 21-29 into which the cartridge 11 can be removably inserted.

Each of the devices 21-29 has, as an integral part thereof, structure which corresponds functionally to the drive 12.

In FIG. 1, the devices 21-29 are shown only by way of example, to give a sense of the wide variety of types of devices with which the cartridge could be used. In this regard, the device 21 is a digital camera, the device 22 is a portable game device, and the device 23 is a handheld computer. The device 23 might alternatively be a unit of the type commonly known as a personal digital assistant (PDA). The device 24 is a server which is coupled by a home computer network 36 to several home computers, two of which are shown at 37 and 38. It will be noted that the server 24 has three slots or receiving units 41-43, which can each removably receive a respective different cartridge of the type indicated at 11. The server does not need to have more than one of the receiving units 41-43, but three units are shown in FIG. 1 in order to emphasize that use of more than one can be advantageous.

The device 25 is a cellular telephone, and the device 26 is a video recording unit which is capable of reading digital video information from the cartridge 11, and/or storing digital video information on the cartridge 11. The device 26 may, for example, be a video recording device similar to the device which is commercially available under the tradename TiVo. The device 27 is a portable "notebook" computer, and the device 28 is a global positioning satellite (GPS) device. The device 28 is responsive to radio signals from not-illustrated satellites for using known techniques to make a precise determination of the current location of the device 28 on the surface of the earth. The cartridge 11 may contain map information for the region in which the GPS device 28 is currently located, so that the device 28 can display a map on its liquid crystal display (LCD) screen, and then indicate on that map the current location of the device 28. The device 29 is an electronic book.

As mentioned above, the various devices 21-29 shown in FIG. 1 are merely exemplary, and it will be recognized that the cartridge 11 could also be used with other types of devices, including variations and modifications of the specific devices shown in FIG. 1. For example, it would be possible for the cartridge 11 to be removably inserted into a compact disk player, a music synthesizer, or an Internet access device designed for use with a television, such as a device of the type commercially available under the tradename WebTV. It will also be recognized from FIG. 1 that the digital information stored in the cartridge 11 can represent a variety of different things, including but not limited to data, photographs, video images, sounds such as music, and so forth.

Figure 2:
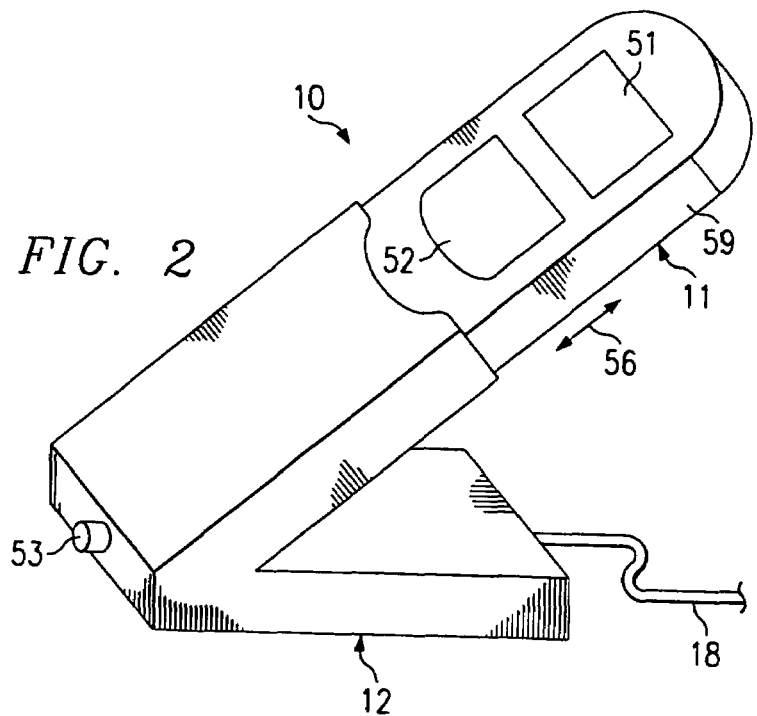
FIG. 2 is a diagrammatic perspective view of the information storage device of FIG. 1.

FIG. 2 is an enlarged perspective view of the information storage device 10 of FIG. 1. The overall appearance of the device 10 in FIG. 2 represents one possible appearance. It will be recognized that the external appearance of the device could take a variety of other forms without departing from the scope of the present invention. In FIG. 2, the cartridge 11 is shown with two labels 51 and 52, one of which may contain user-supplied information regarding the type of information which is currently stored in the cartridge 11. The other label may provide information which is not subject to change, such as the name of the manufacturer, the capacity of the cartridge, and so forth. The cartridge 11 may be inserted and removed from the drive 12 in direction 56. To remove the cartridge 11 from the drive, an eject button 53 is depressed, and the cartridge 11 is gripped along side 59. Of course, the physical design of the cartridge 11 and drive 12 are merely exemplary, and any physical design may be used with the present invention.

Figure 3:
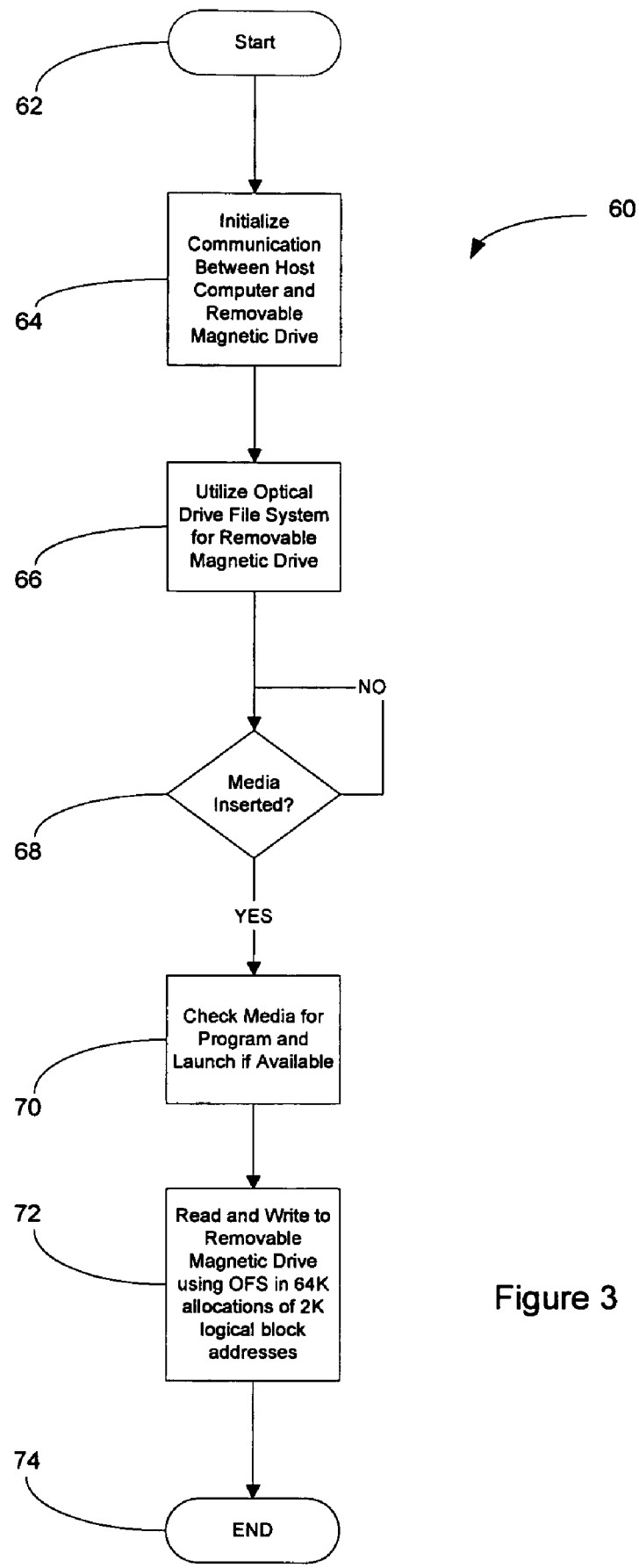
FIG. 3 is a flowchart illustrating the communication interface between the information storage device and the host computer system.

FIG. 3 is a flowchart illustrating the communication interface between the information storage device and the host computer system. The process 60 begins at a START block 62. Proceeding to block 64, the process 60 initializes the communication between the host computer system and the removable magnetic drive. The initialization is typically performed upon boot-up of the computer system, or upon connection of the removable magnetic drive to the computer system. Of course, the initialization process can be started at any time. The initialization allows the removable magnetic drive to exchange information with the host computer system.

Proceeding to block 66, the initialization utilizes an standard file system such as an optical file system to allow the communication between the removable magnetic drive and the communication system. The UDF file system is an example of the optical file that may be used. Using an optical file system such as UDF provides many advantages to the removable magnetic drive, such as:

Large capacity—A UDF-compliant file system will be able to store more data (exceeding the terabyte level), and a larger number of files than current operating systems. This expanded storage space allotment enables UDF to be usable by all current operating systems.

Efficient space allocation—UDF supports volume sizes greater than the size allowed by the original operating system. Small files written to a UDF disk would not take up extra space. e.g.: A 512 byte file on a 2 GB Macintosh HFS volume takes up 32 KB of space. The same file on an optical disk formatted with UDF would only take up 512 bytes.

Use of the UniCode character set—By supporting Uni-Code—a character set comprised of 65,536 possible characters—UDF supports characters from multiple languages including double-byte character sets like Japanese. In comparison, the most commonly used character set today is ASCII which has a limit of 256. UniCode support provides for easy adoption of multiple programming languages for cost-effective global implementation.

File names up to 255 characters—UDF supports all current naming conventions. File names will not have to be truncated when accessed outside their native operating system.

Retention of extended file system attributes—This feature permits flexible multiple Operating System mastering capabilities without compromising the integrity of the originating Operating System.

Multiple volume set support—The UDF file system can handle multiple volume sets allowing users to take advantage of the performance gains and increased storage space obtained through spanning multiple disks.

System-independent archival medium—Adherence to the UDF specification ensures data access regardless of future operating system implementations.

Maximum volume size—As high as 128 terabytes.

Maximum file size—Equal to the size of the volume.

Proceeding to block 68, the process monitors the information storage device 10 to determine is a cartridge 11 has been inserted into the drive 12. If there is no cartridge inserted in the drive 12, the process 60 proceeds along the NO branch back to block 68 to continue to monitor for cartridge 11 insertion. If a cartridge 11 has been inserted into the drive, the process 60 proceeds along the YES branch to block 70.

In block 70, the process 60 checks the information stored on cartridge 11 for a program to launch. With an optical interface, the majority of operating systems provide a method of auto launching an application from recently inserted media, known as the Autorun feature. Under previous removable magnetic media products, a separate installed application such as Active Disk by Iomega Corporation was required to provide similar functionality. Further, if the computer system is in boot mode, the computer may be booted from the information on the cartridge 11. Although removable disk boot support is emerging, booting from optical file systems is easier and more fully supported. Recent systems are all capable of booting a system from a optical device, and many default to boot from the optical device first, then moving onto the built in hard drive if the optical media is missing, or found to be not bootable.

Proceeding to block 72, the process 60 performs reads and writes to the information storage device 10 using CD/DVD type commands (MMC) which are used by the optical file system. Under the optical file systems, the process 60 writes in 64K (Not required or limited to, but utilized for better performance) allocations of 2K logical block addresses. The block design of more recent removable magnetic media systems such as REV™ from Iomega Corporation break from the tradition 512 byte devices in the past, and utilizes an internal 64K ECC block size. Having removable magnetic media systems run on a file system such as FAT32 would diminish the systems performance from having to do Read/Modify/Write operations. The larger 64K allocations of 2K logical block addresses used by the optical file systems increases the performance of removable magnetic media. The process then terminates in END block 74.

Numerous variations and modifications of the invention will become readily apparent to those skilled in the art. Accordingly, the invention may be embodied in other specific forms without departing from its spirit or essential characteristics.

What is claimed is:

1. A method of interfacing with an operating system, the method comprising:

configuring a removable magnetic media system to use an optical drive interface to communicate with the operating system;

using an optical drive file system to enable communication between the removable magnetic media system and the operating system;

performing read and write operations to the removable magnetic media system using MMCs used by the optical drive file system; and storing data on the removable magnetic media system in compliance with the optical drive file system.

2. The method of claim 1, wherein the optical drive file system is the UDF file system.

3. The method of claim 1, further comprising writing data to the removable magnetic media system in 64K allocations of 2K logical block addresses.

4. The method of claim 1, further comprising automatically launching a program when media is inserted into the removable magnetic media system.

5. The method of claim 1, further comprising supporting multiple volume sets.

6. A system for interfacing with an operating system, the system comprising:

a drive which receives a removable magnetic media cartridge; and an optical drive file system to enable communication between the drive and the operating system, wherein the drive is configured to communicate with the operating system using an optical drive interface, the optical drive interface configured to perform read and write operations to the removable magnetic media system using MMCs used by the optical drive file system, and the removable magnetic media system stores data in compliance with the optical drive file system.

7. The system of claim 6, wherein the optical drive file system is the UDF file system.

8. The system of claim 6, wherein the optical drive file system writes data to the removable magnetic media system in 64K allocations of 2K logical block addresses.

9. The system of claim 6, wherein the optical drive file system automatically launches a program when a magnetic media cartridge is inserted into the drive.

10. The system of claim 6, wherein the optical drive file system supports multiple volume sets.

* * * * *